United States Patent
Andela et al.

[11] Patent Number: 5,984,216
[45] Date of Patent: Nov. 16, 1999

[54] WINDSHIELD STRIPPER

[75] Inventors: Cynthia Andela; James Andela, both of Richfield, N.Y.

[73] Assignee: Andela Tool & Machine, Inc., Richfield Springs, N.Y.

[21] Appl. No.: 08/750,207

[22] PCT Filed: Feb. 20, 1996

[86] PCT No.: PCT/US96/02198

§ 371 Date: Nov. 25, 1996

§ 102(e) Date: Nov. 25, 1996

[87] PCT Pub. No.: WO97/30789

PCT Pub. Date: Aug. 28, 1997

[51] Int. Cl.$^6$ .......................... B02C 13/04; B02C 13/286
[52] U.S. Cl. .................. 241/79.2; 241/186.4; 241/189.1; 241/194
[58] Field of Search .......................... 241/79.2, 99, 185.5, 241/186.4, 189.1, 194

[56] References Cited

U.S. PATENT DOCUMENTS

| | | | |
|---|---|---|---|
| 113,443 | 4/1871 | Myers | 240/79.2 |
| 1,960,626 | 5/1934 | Everett | 241/51 |
| 3,436,028 | 4/1969 | Koehnen et al. | 241/186.4 |
| 3,545,690 | 12/1970 | Burian et al. | 241/186.2 |
| 3,637,146 | 1/1972 | Banks | 241/194 |
| 5,465,912 | 11/1995 | Graybill et al. | 241/27 |
| 5,505,390 | 4/1996 | Rodgers | 241/48 |

*Primary Examiner*—John M. Husar
*Attorney, Agent, or Firm*—Michael de Angeli

[57] ABSTRACT

A device for recycling automotive windshields. An automotive windshield is comprised of two layers of glass and a plastic liner sandwiched in between The present invention strips the glass from both surfaces of the inner plastic liner, comminutes the glass and separates the two substances for recovery. A windshield is fed into the unit by means of dual horizontal feed rollers. The windshield then passes over a stationary breaker bar and into the path of a plurality of rotating flexible impactors. The force of the rotating impactors on the top surface and the stationery breaker bar on the under surface act together to strip the glass from both sides of the inner plastic liner material. The glass is hammered into small particles the size of gravel and sand while the plastic breaks into much larger fragments. A shaker screen located below the rotating impactors serves to separate the two substances for individual recovery.

12 Claims, 3 Drawing Sheets

WINDSHIELD STRIPPER

FIELD OF THE INVENTION

This invention relates generally to glass recycling machines. In particular, the present invention is concerned with an apparatus for recycling automotive windshield glass.

BACKGROUND OF THE INVENTION

In order to efficiently recycle or dispose of an automotive windshield, it is desirable to comminute the glass. Numerous machines have been developed specifically for comminuting empty glass containers. These machines typically include an inlet opening through which the glass containers are inserted and an outlet opening through which the broken glass fragments and glass dust are ejected. To accomplish the breaking of the glass, these machines usually employ either a crushing apparatus or a hammermill form of breaker apparatus.

For several reasons, existing glass comminuting machines are not well adapted for the recycling or disposal of automotive windshields. First, such devices are extremely large and are typically only found at large recycling plants. It is not common for an auto shop to have ready access to such a recycling machine. Second, the inlet opening through which the glass enters the comminuting machine is typically of a dimension which requires that the windshield be broken into smaller pieces prior to its insertion into the opening.

Third, an automotive windshield is comprised of two layers of glass and a plastic liner bonded securely between them. This construction requires that the glass must first be freed from the plastic liner material before it can be recycled.

A fourth problem associated with existing devices employed for the recycling of automotive windshields is that machines that employ a crusher-type apparatus are susceptible to jamming when plastic is inserted into the machine's outlet. The presence of the plastic liner sandwiched between the two layers of glass thus prevents the use of this type of machine.

Finally, after the glass has been freed from the surface of the plastic liner, the two materials are commingled and must be separated for recovery and recycling.

It is therefore desirable to provide an apparatus that can accommodate a glass sheet of the dimensions of an automotive windshield, and thereby eliminate the need to fragment the sheet prior to beginning the recycling or disposal process.

It is also desirable to provide an apparatus that can strip the two layers of glass off of the inner plastic liner material and then separate the two substances for recovery.

SUMMARY OF THE INVENTION

It is a feature of the present invention to provide a compact automotive windshield recycling machine that can be used on site, thereby eliminating the need to transport the windshield to an independent recycling plant. Due to its small, compact size, the recycling machine of the present invention can be placed in a typical automotive or glass repair shop without taking up a large amount of valuable work space. The compact, space saving feature will also be of value to a central recycling plant.

It is a second feature of the present invention to provide a glass recycling machine having an inlet opening that will accommodate the full width of an automotive windshield, thereby eliminating the need to fragment the sheet of glass prior to utilizing the machine. The sheet of glass is drawn into the machine by dual feed rollers that each have a shaft on both ends. The shafts extend through openings in the housing side plates and turn in a bearing mounted on an offset. The lower offsets are fixedly mounted to the housing side plates while the upper offsets are slidably attached to the housing side plates, allowing the upper roller to part and accommodate the thickness of the glass windshield.

It is another feature of the present invention to include a stationery breaker bar and an adjustable rotating impactor shaft having a plurality of flexible impactors attached thereto. As the glass sheet is feed into the interior of the machine via the feed rollers, it passes over the stationery breaker bar and into the line of impact of the rotating flexible impactors. The combination of the stationery breaker bar and the rotating impactors acts to strip the glass from both sides of the inner plastic liner. The glass is hammered into particles the size of fine gravel and sand while the plastic liner remains in much larger fragments.

It is a further feature of the present invention to provide a shaker screen below the rotating impactor shaft. The much smaller sized glass granules pass through the shaker screen into a glass recovery container below the unit. The larger plastic fragments remain on the shaker screen and are carried out of the unit and into a separate recovery container.

BRIEF DESCRIPTION OF THE DRAWINGS

These and other advantages of the present invention will become more readily apparent upon reading the following detailed description and upon reference to the drawings in which.

DETAILED DESCRIPTION OF THE DRAWINGS

Figure 1:
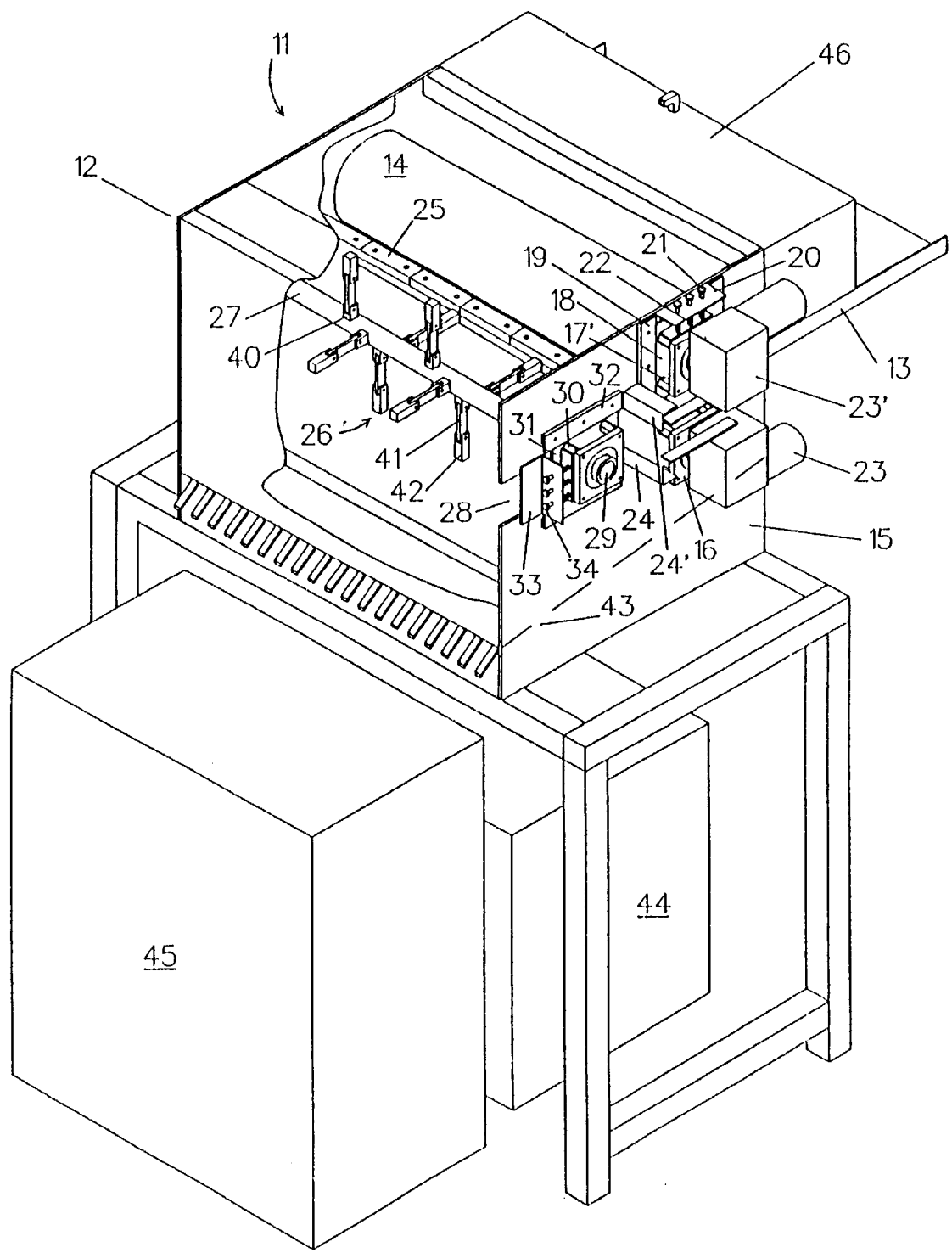
FIG. 1 is an isometric view of a preferred embodiment of the stripper/recycling machine of the present invention.

Referring now specifically to the drawings, there is illustrated an automotive windshield stripper/recycling machine, generally designated as 10, wherein like reference numerals refer to like elements throughout the drawings.

As can be seen in FIG. 1, the windshield stripper 11 comprises a box-like housing 12 having a rear mounted infeed table 13. A windshield placed onto infeed table 13 is drawn into the housing 12 by means of two parallel horizontal feed rollers 14. Both feed rollers 14 extend the full width of the housing 12 and have a shaft (not shown) attached at each end. Each shaft extends through an opening in one of the housing side plates 15 and into bearings 16 that are mounted on offsets 17, 17'. Seals (not shown) are utilized to isolate each of the bearings 16 from abrasive residual glass dust. The lower offsets 17 are fixedly mounted on the outer surface of each of the opposing housing side plates 15. The upper offsets 17' are affixed to mounting plates 18 that are held against the housing side plate 15 by means of two retaining strips 19 that are securely attached to the housing side plate 15. Thus, the mounting plates 18 can slide freely between housing side plate 15 and retaining strips 19. Mounted on each of the housing side plates 15 proximate the slidable mounting plate 18 is a bracket 20 having screws 21 passing therethrough. Mounted on screws 21 are heavy duty compression springs 22. Compression springs 22 apply pressure to the offsets 17' such that feed rollers 14 are compressed together. As a windshield is feed into the unit 11, compression springs 22 allow mounting plates 18 to slide upward between the housing side plate 15 and retaining strips 19 and thereby raise upper feed roller 14 to accommodate the thickness of the windshield. Compression springs 22 exert enough pressure to securely hold the windshield and feed it into the unit 11 without slippage.

Referring to FIG. 1, each of feed rollers 14 are driven directly by a gear reducer and motor assembly 23, 23'. Gear reducer/motor assemblies 23, 23' are mounted on one end of each feed roller shaft. Anti-rotation devices 24, 24' are attached to each gear reducer to prevent rotation movement of the gear reducer/motor assembly 23, 23'.

As shown in FIG. 1, after the windshield enters the unit 11 through feed rollers 14, it passes over stationery breaker bar 25 which extends the full width of the housing 12. Breaker bar 25 is formed of a hardened abrasion resistant material such as steel. As the windshield passes over the edge of breaker bar 25, it comes Into the path of a plurality of rotating flexible impactors 26. The force of the rotating impactors 26 acts to pull the windshield down over breaker bar 25 and to strip the glass off of the inner plastic liner. It is the combination of the stationery breaker bar 25 on the underside and the rotating flexible impactors 26 on the topside of the windshield which acts to strip the glass off of both surfaces of the plastic liner. The glass is hammered into particles the size of fine gravel and sand while the plastic liner remains in much larger fragments.

Figure 2:
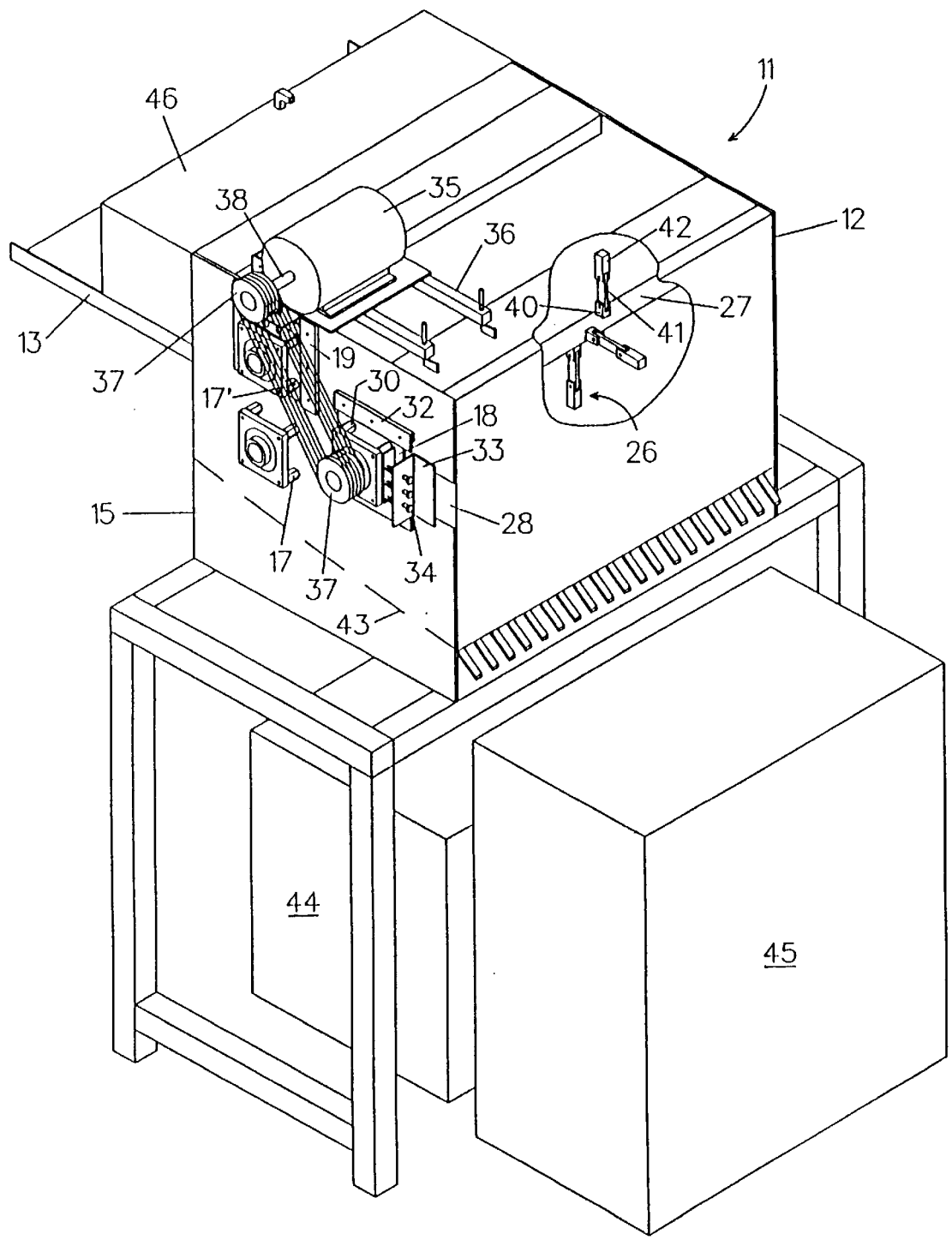
FIG. 2 is an isometric view of a preferred embodiment of the stripper/recycling machine of the present invention.

Referring to FIGS. 1 and 2, it is seen that flexible impactors 26 are mounted on a rotating impactor shaft 27 that extends the full width of housing 12 and out through openings 28 in each housing side plate 15. Rotating impactor shaft 27 turns in bearings 29 mounted on offsets 30 that are mounted on mounting plates 31. Mounting plates 31 are held securely in place against housing side plate 15 by means of two retaining strips 32. Secured to each housing side plate 15, proximate impactor shaft offsets 30, is an adjustment device 33 which functions to move impactor shaft 27, and consequently, flexible impactors 26, closer to stationery breaker bar 25 as the flexible impactors 26 become shorter with wear over time. As shown, adjustment device 33 can be screws 34 abutting impactor shaft offsets 30. To implement adjustment device 33, the screws are loosened on retaining strips 32, thereby freeing mounting plate 31, and as screws 34 are engaged against offsets 30, mounting plates 31 are moved, and consequently, bearings 29, impactor shaft 27 and flexible impactors 26. After flexible impactors 26 have been properly repositioned, retaining strips 32 are then retightened to resecure mounting plate 31 to the housing side plate 15.

Figure 4:
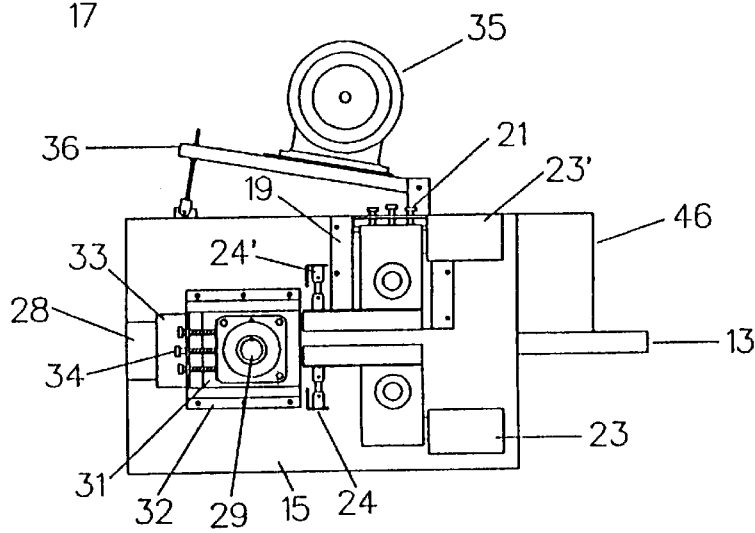
FIG. 4 is a first side view of a preferred embodiment of the stripper/recycling machine of the present invention.
Figure 5:
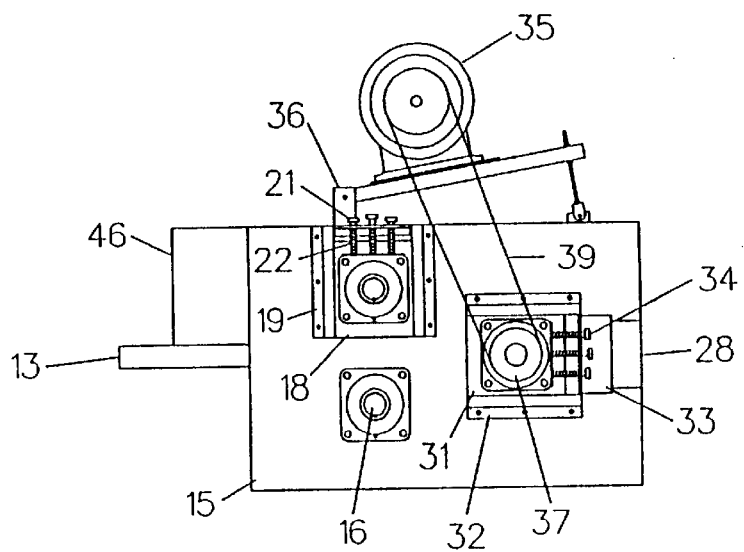
FIG. 5 is a second side view of a preferred embodiment of the stripper/recycling machine of the present invention.

As seen in FIGS. 2, 4 and 5, opening 28 in housing side plate 15 extends forward to the front edge of housing plate 15. To remove impactor shaft 27 from the unit, as may be required for maintenance, adjustment device 33 is first removed and then retaining strips 32 are loosened, freeing mounting plates 31. Impactor shaft 27 can then be removed out through opening 28 and from the unit. The ease with which impactor shaft 27 can be removed greatly facilitates maintenance and replacement of flexible impactors 26.

Figure 3:
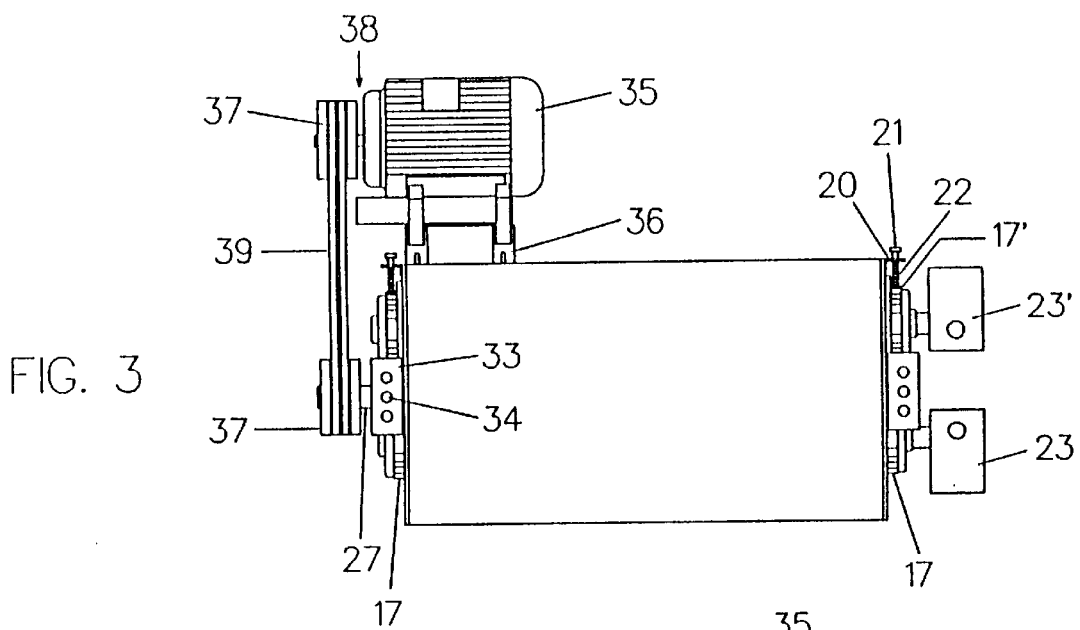
FIG. 3 is a front view, depicting the belt drive mechanism of a preferred embodiment of the stripper/recycling machine of the present invention.

As seen in FIGS. 2, 3 and 5, rotating impactor shaft 27 is driven by motor 35 which is secured to adjustable motor mount 36 on the top surface of housing 12. Power is transferred from motor 35 to impactor shaft 27 by means of a belt drive system. Bearings and sheaves 37 are mounted on motor drive shaft 38 and impactor shaft 27. Belts 39 encircle the two sheaves 37.

Referring to FIG. 1 and 2, it is seen that flexible impactors 26 are comprised of a stanchion 40, a link 41 and a hammer 42. To increase the flexibility of the impactors 26, stanchion 40 and hammer 42 are pivotally attached to opposite ends of link 41. The links 41 and hammers 42 are formed of hardened abrasion resistant steel or other hard abrasion resistant material. Preferably, flexible impactors 26 are securely mounted onto rotating impactor shaft 27 in a spiral pattern, although other balanced manners can be used.

As shown in FIG. 1 and 2, a preferred embodiment of the present invention includes a downwardly slanted shaker screen 43 that is located directly below the rotating flexible impactors 26. As the glass Is stripped from the inner plastic liner, it is hammered into particles the size of fine gravel and sand, while the plastic liner is broken into much larger fragments. The glass particles pass through shaker screen 43 into recovery container 44 located below housing 12. The plastic fragments remain on shaker screen 43 and slide down into a second recovery container 45.

As can be seen in FIG. 1, 2, 4, and 5, infeed guard 46 is mounted on the rear of housing 12, over infeed table 13. Infeed guard 46 protects the operator from the rotating action of feed rollers 14 and from any glass which might pop off the windshield. As the windshield is impacted and pulverized, abrasive glass dust is created. A dust collection device or spraying a fine mist on the windshield as it is fed into the feed rollers can control this residual glass dust. Infeed guard 46 provides a point of attachment for a dust collection unit or a misting device.

The embodiments disclosed herein have been discussed for the purpose of familiarizing the reader with the novel aspects of the invention. Although preferred embodiments of the invention have been shown, many changes, modifications and substitutions may be made by one of ordinary skill in the art without necessarily departing from the spirit and scope of the invention as described in the following claims.

We claim:

1. A device for comminuting an automotive windshield comprising first and second glass sheets laminated on either side of a planar plastic liner, and separating the glass and plastic thereof, comprising:

a hollow housing having an inlet aperture formed therein;

a pair of infeed rollers mounted within said housing and juxtaposed to said inlet aperture and driven for rotation about horizontal axes, whereby a windshield to be comminuted is fed into said aperture and drawn into said housing by said rollers at a substantially constant rate;

a breaker bar fixed within said housing, said breaker bar defining a sharp horizontal edge parallel to the axes of said paired infeed rollers and disposed proximate said rollers, such that a windshield fed between said rollers passes over said sharp edge of said breaker bar;

a flail assembly comprising a shaft driven for rotation about an axis parallel to said sharp edge of said breaker bar, and a plurality of impactors mounted on said shaft, said flail assembly being disposed within said housing such that as said shaft is rotated, distal ends of said impactors pass closely by said sharp edge of said breaker bar, and force an exposed edge portion of said windshield downwardly over said sharp edge of said breaker bar, whereby said impactors comminute said upper and lower sheets thereof into relatively small fragments of glass, and break said plastic liner into relatively larger fragments; and size discrimination separation means for separating said relatively small fragments of comminuted glass from relatively large fragments of the plastic of said liner.

2. The device of claim 1, wherein said size discrimination separation means comprises a shaker screen mounted below said rotating flail assembly.

3. The device of claim 1, further comprising:

an infeed table mounted to the exterior of said housing adjacent to said horizontally oriented feed rollers; and an infeed guard mounted over said infeed table.

4. The device of claim 1, wherein at least a first of said paired infeed rollers is spring-biased toward the second thereof, whereby said rollers can part to admit a windshield therebetween.

5. The device of claim 1, wherein said shaft of said flail assembly is journaled on bearings mounted for convenient adjustment of the position of the axis of said flail assembly with respect to said breaker bar, whereby the spacing of the distal ends of said flails from said sharp edge of said breaker bar can be maintained at a desired distance.

6. The device of claim 1, wherein said impactors each comprise:

a stanchion attached to said impactor shaft;

a link pivotally attached to said stanchion; and a hammer pivotally attached to said link.

7. The device of claim 6, wherein said links and said hammers are formed of a hardened abrasion resistant material.

8. The device of claim 7, wherein said hardened abrasion resistant material is hardened abrasion resistant steel.

9. A device for comminuting glass layers of an automotive windshield and breaking a plastic liner thereof, and separating glass and plastic fragments thus created, comprising:

a hollow housing;

a pair of horizontally oriented feed rollers operatively attached to a drive means;

a horizontal breaker bar fixedly attached within said housing, proximate said horizontally oriented feed rollers; and a flail assembly within said housing, proximate said breaker bar, said flail assembly comprising an impactor shaft mounted for rotation about a horizontal axis and a plurality of impactors mounted on said rotating impactor shaft;

means for rotating said impactor shaft;

wherein said impactor shaft is spaced from said breaker impactors mounted on said rotating impactor shaft;

means for rotating said impactor shaft;

wherein said impactor shaft is spaced from said breaker bar such that distal tips of said impactors closely approach a cutting edge of said breaker bar, forcing an exposed edge portion of said windshield downwardly over said edge, comminuting the glass thereof into relatively small fragments but breaking the plastic liner into relatively larger fragments; and means for performing a size-based separation of said glass and plastic fragments.

10. The device of claim 9, wherein said impactors each include:

a stanchion attached to said rotating impactor shaft;

a link pivotally attached to said stanchion; and a hammer pivotally attached to said link.

11. The device of claim 10, wherein said links and hammers are each formed of a hardened abrasion resistant steel.

12. The device of claim 9, wherein said impactor shaft is mounted for rotation in bearings carried by means permiting convenient adjustment of the relative spacing of distal ends of said impactors from said breaker bar.

* * * * *